June 21, 1949.　　　　E. H. SHAFF　　　　2,473,913
APPARATUS FOR UPSETTING BLIND RIVETS
HAVING RIGHT ANGLE BEND IN STEM
Original Filed Nov. 5, 1942
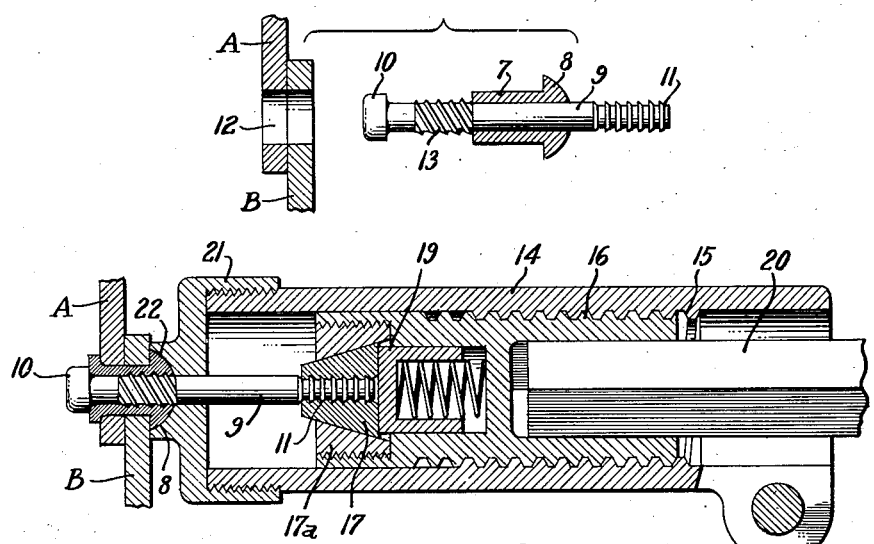
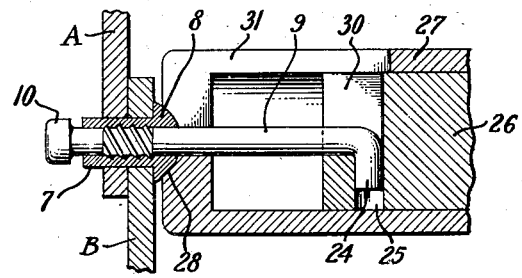
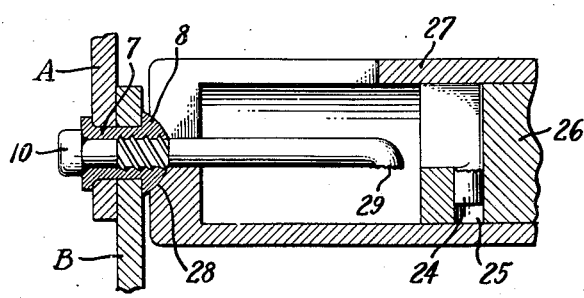
INVENTOR,
ERNEST H. SHAFF.
BY
ATTORNEY Patented June 21, 1949

2,473,913

UNITED STATES PATENT OFFICE 2,473,913

APPARATUS FOR UPSETTING BLIND RIVETS HAVING RIGHT ANGLE BEND IN STEM

Ernest H. Shaff, Spring Lake, Mich., assignor to Cherry Rivet Company, Los Angeles, Calif., a corporation of California Original application November 5, 1942, Serial No. 464,677. Divided and this application September 27, 1945, Serial No. 618,853

1 Claim. (Cl. 218—19)

This invention relates to blind rivets, and has particular reference to a blind rivet of the type in which the rivet setting stem or mandrel is adapted to be drawn through a rivet body to upset the shank of the rivet in place in workpieces, and to an apparatus for pulling the rivet mandrel to perform such upsetting operation.

This application is a division of my copending application, Serial No. 464,677, filed November 5, 1942, now Patent No. 2,385,886, issued October 2, 1945, which describes and claims a modified form of rivet construction.

In my copending application, Serial No. 464,677 noted above, there is described and illustrated a form of blind rivet which comprises a hollow rivet body adapted to be inserted into rivet holes in sheets or other devices to which the rivet is to be attached, with a stem extending through the rivet body, including a portion comprising a forming head, immediately adjacent to which the stem is provided with one or more helical threads extending outwardly from the body of the stem and adapted, when the stem is drawn inwardly of the rivet body and partially rotated, to cut gripping threads in the rivet body while at the same time expanding the rivet body radially to perform the triple function of enlarging the rivet body radially to insure tight fit within the rivet holes, upsetting the end of the rivet body to hold the rivet securely in place, and to threadedly engage the stem and rivet body to insure retention of the stem within the deformed rivet body.

It is an object of this invention to provide a rivet of the character described and claimed in the aforesaid application, characterized by the forming of a pulling head on the stem or mandrel member, in a simple and inexpensive manner.

Another object of this invention is to provide a rivet of the character described, in which the mandrel or stem extending from the head end of the rivet body, is bent at a considerable angle to the longitudinal axis of the major portion of the stem, such bent end of the stem providing a means by which the mandrel may be engaged by a pulling tool and through which the pulling forces exerted by the pulling tool, may be transmitted between the mandrel and the rivet body in the course of the upsetting operation.

Another object of my invention is to provide a pulling tool having a mandrel stem engaging member so formed as to readily receive the bent end of the stem and to engage the same in a manner permitting the transmission of the necessary pulling forces to cause the upsetting operation.

Other objects of my invention will be apparent from a study of the following specifications read in connection with the accompanying drawings, wherein:

Fig. 1 is a longitudinal sectional view through a tubular rivet constructed in accordance with my invention;

Fig. 2 is a fragmentary longitudinal sectional view illustrating one form of apparatus for applying the rivet shown in Fig. 1;

Fig. 3 is a fragmentary longitudinal sectional view of a rivet constructed in accordance with my invention, and a portion of another form of pulling tool adapted to engage a bent stem on the mandrel of the rivet illustrated therein; and Fig. 4 is a view similar to Fig. 3, showing the relation of the parts after the rivet has been set.

The rivet assembly comprises two principal parts, namely, the rivet proper or rivet body and its forming stem. The rivet proper consists of a tubular shank 7 having a head 8 at its outer end. The shank 7 has a smooth axial bore through which is inserted a forming stem 9 having at its inner end a forming head 10 and at its outer end a section 11 specially constructed to permit of a firm gripping action on the stem. The head 10 is of a diameter adapted to be entered through registering holes 12 in two plates or parts A and B which are to be fastened together.

The forming stem 9 is provided near the head 10 with a portion 13 of an external diameter somewhat larger than the internal diameter of the rivet bore and having one or more radially extending helical ribs or threads formed thereon and operative when the forming stem is withdrawn axially through the shank 7 to exert a radial expansive force upon the shank which serves not only to bind the forming stem in the shank but also to expand the latter into engagement with the edges of the holes 12 of the parts A and B.

In the operation of upsetting the inner end of the tubular shank 7, a combined axial and rotational movement is imparted to the forming stem 9. As will be seen from a comparison of Figs. 1 and 2, the helically threaded portion 13 is in this operation first moved into intimate binding engagement with the rivet shank 7, and upon engagement between the forming head 10 of the stem and the inner end of the shank 7 the continued rotational and axial movement imparted to the forming stem causes the helically threaded portion 13 to continue its movement with a screw feed during the upsetting operation. As a result, the upsetting is performed not only because of an axial movement imparted to the stem but by a rotary screw threading action substantially augmenting the force required to be applied axially to perform the upsetting operation.

Referring now to Fig. 2, I have provided a preferred form of puller for use in applying the rivet. This device comprises a tool body formed as a cylindrical casing 14 internally threaded as at 15 to receive a screw actuator 16. The inner end of the actuator is provided with a suitable chuck 17 for gripping the outer serrated end of the forming stem 9. The chuck jaws are yieldably held contracted by means of a spring-pressed plunger 19 cooperating with a contracting cone 17ª. The actuator 16 may be rotated in any suitable way as by means of a squared shaft 20 operated either manually or by a suitable source of power. The forward end of the casing or body 14 has a cap 21 apertured for the passage of the forming stem 9, and when the actuator is advanced to the front end of the casing the chuck jaws engage with the cap and are forced rearwardly in the actuating cone 17ª to permit of insertion and removal of the forming stem. The cap 21 also has formed integral therewith a concave recess 22 shaped to form a seat for the head 8.

In applying the rivet, the serrated end 11 of the forming stem is inserted into the chuck 17 of the puller. The rivet assembly is then inserted through the aligned holes 12 in the parts A and B, and with the concave nose 22 of the tool engaging with the head 8, a rotary motion is imparted to the shaft 20. As the screw 16 is turned, the end portion 11 of the forming stem is gripped by the jaws of the chuck 17 which are coincidentally forced by the contracting cone 17ª tightly into firm gripping engagement with the stem. A combined rotational and axial force is thus imparted to the forming stem and as the latter is drawn through the tubular shank, the head 10 thereof is forced axially and simultaneously rotated so as to upset the inner end of the tubular rivet shank with a rolling motion. Co-incidentally, the threaded portion 13 of the stem, being of an external diameter somewhat larger than the internal diameter of the shank, forces the latter radially outward into engagement with the edges of the holes 12 while at the same time exerting a binding action between the forming stem and the tubular rivet. The axial movement of the forming stem through the tubular shank is facilitated by the fact that the pitch of the threads 15 corresponds to the pitch of the threaded portion 13. Finally, a reverse rotation is imparted to the driving member 20 to permit the chuck 17 to be disengaged from the serrated end portion 11 of the stem 9.

In the embodiment of the invention illustrated in Figs. 3 and 4, the construction and method of applying the rivet is substantially similar to that above described. In this instance, however, the outer end portion of the forming stem is bent at right angles, as indicated at 24, for insertion into an open-ended socket 25, extending radially outward from the axis of an actuator member 26. The latter is slidable axially within a casing 27 having at its forward end a concave nose portion 28 for receiving the head 8 of the tubular rivet. As in the case of the pulling device of Fig. 2, a combined rotational and axial force is applied to the actuator 26. Upon the completion of the setting operation, the bent end portion 24 of the forming stem is sheared off as indicated at 29. Rupture of the forming stem at the end of the riveting operation is desirable in that it provides a definite indication to the operator that the rivet has been headed; and provision for such rupture by a shearing action has been found to be advantageous because it permits of an accurate determination of the amount of force necessary to be applied to insure best results. It will be understood that the bent end portion 24 facilitates chucking of the forming stem both for purposes of axial as well as rotational movement.

In the form of pulling tool illustrated in Figs. 3 and 4, it will be observed that the actuator 26 is provided with a lateral slot 30 which is formed in the end of the actuator 26 and communicates with the socket 25 by which the rivet stem or mandrel 9 may be engaged by the actuator, through the simple operation of laterally sliding the stem relative to the actuator 26 to dispose the bent end 24 of the stem 9 in alignment with the socket 25, the lateral movement causing the end 24 to pass into the socket 25.

A slot 31 extending laterally through the casing 27 adjacent its outer end, is alignable with the slot 30 so that the stem 9 may be readily inserted through the slot 31 of the casing 27 and into its socketed relation as shown in Fig. 3.

It will be observed from the foregoing that the complication both as to structure and the mode of operation involved in the form of rivet shown in Figs. 1 and 2, and the actuator with its gripping jaws illustrated in Fig. 2, may be avoided by the simplified construction shown in Figs. 3 and 4, it being necessary in the formation of the rivet only to perform the simple operation of bending the end 24 of the stem sharply with respect to the major portion of the stem or mandrel 9, and the mere provision of the slots and sockets as described herein.

The construction illustrated in Figs. 3 and 4 is equally adaptable either to the type of rivet in which the mandrel 9 is made without the helical ribs 13, or the type in which the helical ribs 13 are provided, the actuator engaging the bent stem portion 24 being capable of exerting either only an axial pull, or a combined axial pull and rotary movement to be imparted to the mandrel.

While I have shown and described the preferred embodiment of my invention, I do not desire to be limited to any of the details of construction shown and described herein, except as defined in the appended claim.

I claim:

In an apparatus for setting blind rivets of the type having a rivet body including a hollow shank and head and having therein a setting mandrel with a projecting stem that has a sharply bent end portion extending away from the stem such a distance as to provide a substantial gripping portion, the combination of a casing member having a front abutment end engageable with the end of the rivet opposite to the shank thereof, an actuator mounted for movement relative to said casing member in the direction of the longitudinal axis of said engaging member, a transverse slot in said actuator extending through the end thereof disposed toward the abutment end of said casing member from the periphery thereof to a point somewhat beyond the axis of said actuator, a transverse recess in said actuator at the rear of said slot extending from said slot at a sharp angle and for a substantial distance to receive the bent end of said stem when said stem is inserted laterally through said slot, and a lateral slot extending through the end of said casing member alignable with said slot in said actuator to permit the passage of the stem of the rivet laterally with respect to both the casing member and the actuator to dispose the bent end of the stem in the recess in the actuator.

ERNEST H. SHAFF.

REFERENCES CITED

The following references are of record in the file of this patent:

UNITED STATES PATENTS

| Number | Name | Date |
| --- | --- | --- |
| 13,177 | Louden | July 3, 1855 |
| 352,226 | Courtney | Nov. 9, 1886 |
| 660,566 | Gage | Oct. 30, 1900 |
| 721,766 | Williamson | Mar. 3, 1903 |
| 1,690,993 | LeRoy | Nov. 6, 1928 |
| 1,920,362 | Dean | Aug. 1, 1933 |
| 2,148,977 | Buck | Feb. 28, 1939 |
| 2,183,543 | Cherry | Dec. 19, 1939 |
| 2,384,037 | Kugler | Sept. 4, 1945 |
| 2,384,321 | Lees | Sept. 4, 1945 |
| 2,385,886 | Schaff | Oct. 2, 1945 |